United States Patent
Xu et al.

(10) Patent No.: US 9,483,837 B2
(45) Date of Patent: Nov. 1, 2016

(54) COMPENSATING FOR MOTION DURING REAL-TIME BATCH PROCESSING OF VIDEO FOR PHYSIOLOGICAL FUNCTION ASSESSMENT

(71) Applicant: Xerox Corporation, Norwalk, CT (US)

(72) Inventors: Beilei Xu, Penfield, NY (US); Survi Kyal, Rochester, NY (US); Lalit Keshav Mestha, Fairport, NY (US); Graham S. Pennington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 287 days.

(21) Appl. No.: 14/211,455

(22) Filed: Mar. 14, 2014

(65) Prior Publication Data
US 2015/0262338 A1 Sep. 17, 2015

(51) Int. Cl.
*G06T 7/20* (2006.01)

(52) U.S. Cl.
CPC ....... *G06T 7/20* (2013.01); *G06T 2207/10016* (2013.01); *G06T 2207/10024* (2013.01); *G06T 2207/30076* (2013.01); *G06T 2207/30088* (2013.01)

(58) Field of Classification Search
None
See application file for complete search history.

(56) References Cited

U.S. PATENT DOCUMENTS

| 5,204,944 | A | 4/1993 | Wolberg et al. |
| 8,564,832 | B2 | 10/2013 | Conlon |
| 2003/0053682 | A1 | 3/2003 | Haikin et al. |
| 2003/0212336 | A1* | 11/2003 | Lee ............ A61B 5/02416 600/504 |
| 2004/0160525 | A1* | 8/2004 | Kingetsu ........ H04N 5/23248 348/364 |
| 2009/0041125 | A1* | 2/2009 | Ohgose ............ H04N 19/527 375/240.16 |
| 2009/0174726 | A1 | 7/2009 | Ollivier |
| 2010/0179389 | A1* | 7/2010 | Moroney, III ...... G06F 19/3406 600/301 |
| 2011/0109919 | A1 | 5/2011 | Conlon et al. |
| 2011/0298819 | A1 | 12/2011 | Evans et al. |
| 2012/0007877 | A1 | 1/2012 | Butler |

(Continued)

OTHER PUBLICATIONS

Xia, Junyi, and R. Alfredo Siochi. "A real-time respiratory motion monitoring system using KINECT: Proof of concept." Medical physics 39, No. 5 (2012): 2682-2685.*

(Continued)

*Primary Examiner* — Sumati Lefkowitz
*Assistant Examiner* — Carol Wang
(74) *Attorney, Agent, or Firm* — Philip E. Blair; Fleit Gibbons Gutman Bongini & Bianco P.L.

(57) ABSTRACT

What is disclosed is a system and method for compensating for motion during processing of a video of a subject being monitored for physiological function assessment. In one embodiment, image frames are received. Successive batches of N video frames are processed to isolate pixels associated with a body region of the subject where a physiological signal is registered by the camera. The pixels are processed to obtain a time-series signal for each batch. A determination is made whether movement during video acquisition of this batch of image frames exceeds a threshold level. If so then a size N of the next batch of image frames is changed to: $N=N+M_1$, where $N+M_1 \leq N_{max}$. Otherwise, a size N of a next batch is changed to: $N=N-M_2$, where $N-M_2 \geq N_{min}$. Thereafter, processing repeats in a real-time continuous manner as the next batch of the N image frames is received. Various embodiments are disclosed.

25 Claims, 3 Drawing Sheets

(56) References Cited

U.S. PATENT DOCUMENTS

| | | |
|---|---|---|
| 2012/0249536 A1 | 10/2012 | Sutou |
| 2012/0307264 A1 | 12/2012 | Arregui et al. |
| 2013/0251225 A1* | 9/2013 | Liu .................... G01R 33/5673 382/131 |
| 2014/0085495 A1* | 3/2014 | Almalki ............. H04N 5/23251 348/208.6 |

OTHER PUBLICATIONS

Lewandowska, Magdalena, Jacek Rumiński, and Tomasz Kocejko. "Measuring pulse rate with a webcam—a non-contact method for evaluating cardiac activity." In Computer Science and Information Systems (FedCSIS), 2011 Federated Conference on, pp. 405-410. IEEE, 2011.*

Sun, Yu, Sijung Hu, Vicente Azorin-Peris, Stephen Greenwald, Jonathon Chambers, and Yisheng Zhu. "Motion-compensated noncontact imaging photoplethysmography to monitor cardiorespiratory status during exercise." Journal of biomedical optics 16, No. 7 (2011): 077010-077010.*

Poh, Ming-Zher, Daniel J. McDuff, and Rosalind W. Picard. "Non-contact, automated cardiac pulse measurements using video imaging and blind source separation." Optics express 18, No. 10 (2010): 10762-10774.*

Rubins, U., V. Upmalis, O. Rubenis, D. Jakovels, and J. Spigulis. "Real-time photoplethysmography imaging system." In 15th Nordic-Baltic Conference on Biomedical Engineering and Medical Physics (NBC 2011), pp. 183-186. Springer Berlin Heidelberg, 2011.*

Kyal et al., "Using an Adaptive Band-Pass Filter to Compensate for Motion Induced Artifacts in a Physiological Signal Extracted From Video", U.S. Appl. No. 14/099,358, filed Dec. 6, 2013.

Kyal et al., "Real-Time Video Processing for Respiratory Function Analysis", U.S. Appl. No. 14/195,111, filed Mar. 3, 2014.

Xu et al., "Compensating for Motion Induced Artifacts in a Physiological Signal Extracted From a Single Video", U.S. Appl. No. 13/923,588, filed Jun. 21, 2013.

Xu et al., "Compensating for Motion Induced Artifacts in a Physiological Signal Extracted From Multiple Videos", U.S. Appl. No. 13/923,612, filed Jun. 21, 2013.

\* cited by examiner

COMPENSATING FOR MOTION DURING REAL-TIME BATCH PROCESSING OF VIDEO FOR PHYSIOLOGICAL FUNCTION ASSESSMENT

TECHNICAL FIELD

The present invention is directed to systems and methods for compensating for motion during processing of image frames of a video of a subject being monitored for physiological function assessment in a non-contact, remote sensing environment.

BACKGROUND

Monitoring of patient cardio-respiratory events is of vital clinical importance in the early detection of potentially fatal conditions. Current technologies that involve contact sensors require that the individual wears such devices constantly. Such a requirement can lead to discomfort, psychological dependence, loss of dignity, and may even cause additional medical issues such as skin infection when sensors have to be worn for an extended period of time. Elderly patients, infants, and those suffering from chronic medical conditions are more likely to suffer from such negative effects of continuous monitoring. The use of an unobtrusive, non-contact, imaging based monitoring of physiological events can go a long way towards alleviating some of these issues. Previous efforts have been directed to systems and methods which employ video imaging devices for monitoring a patient for a desired physiological function. In these methods, videos are captured of a region of interest of the resting patient and processed to estimate cardiac and respiratory functions from physiological signals extracted from time-series signals obtained from those videos. Xerox researchers have determined that movement by the resting patient such as turning the head, moving an arm, and the like, or by the environment such as camera shaking, moving shadows casted by an observer, may impart or induce motion artifacts into the physiological signals extracted from a video of that patient. The present application is directed to this issue.

Accordingly, what is needed in this art are systems and methods for compensating for motion during processing of a video of a subject being monitored for physiological function assessment in a non-contact, remote sensing environment.

INCORPORATED REFERENCES

The following U.S. patents, U.S. patent applications, and Publications are incorporated herein in their entirety by reference.

"Compensating For Motion Induced Artifacts In A Physiological Signal Extracted From A Single Video", U.S. patent application Ser. No. 13/923,588, Xu et al.

"Compensating For Motion Induced Artifacts In A Physiological Signal Extracted From Multiple Videos", U.S. patent application Ser. No. 13/923,612, by Xu et al.

"Using An Adaptive Band-Pass Filter To Compensate For Motion Induced Artifacts In A Physiological Signal Extracted From Video", U.S. patent application Ser. No. 14/099,358, Kyal et al.

"Real-Time Video Processing For Respiratory Function Analysis", U.S. patent application Ser. No. 14/195,111, Kyal et al.

BRIEF SUMMARY

What is disclosed is a system and method for compensating for motion during processing of a video of a subject being monitored for physiological function assessment in a non-contact, remote sensing environment. One embodiment of the present method involves the following. Image frames of a video of the subject are received in real-time for processing in accordance with the teachings disclosed herein. The video is of a body region of the subject where a time-varying signal corresponding to a desired physiological function can be registered by the video device used to capture that video. An initial size of a first batch of N video image frames is defined for processing, such that $N_{min} \leq N \leq N_{max}$, where $N_{min}$ is a minimum size of a batch of image frames for example 10 seconds, and $N_{max}$ is a maximum size of a batch of image frames for example 30 seconds. A number of frames $M_1$ and $M_2$ are defined where $M_1$ is a size a batch is to be increased and $M_2$ is a size a batch is to be decreased on each iteration. These batches correspond to values preceeding or succeeding the current batch. Thereafter, batches of N image frames are processed as follows. On a first iteration, the initial size N of a batch of image frames is processed. On successive iterations, the size of a batch of image frames is adjusted based on detected movement. Each batch of N image frames is processed to isolate pixels associated with the body region of the subject where a physiological signal corresponding to the desired physiological function is registered by the video camera. The isolated pixels are processed to obtain a time-series signal for the current batch. A physiological signal is extracted from the time-series signal for this batch. A determination is made whether a movement occurred during acquisition of this batch of image frames which exceeded a threshold level. If the amount of movement exceeds the threshold then a size N of a next batch is changed to: $N=N+M_1$, where $N+M_1 \leq N_{max}$. Otherwise, a size N of a next batch is changed to: $N=N-M_2$, where $N-M_2 \geq N_{min}$. Processing repeats in a real-time continuous manner as the next batch of N image frames is received. In such a manner, motion is dynamically compensated during real-time processing of the video.

Features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
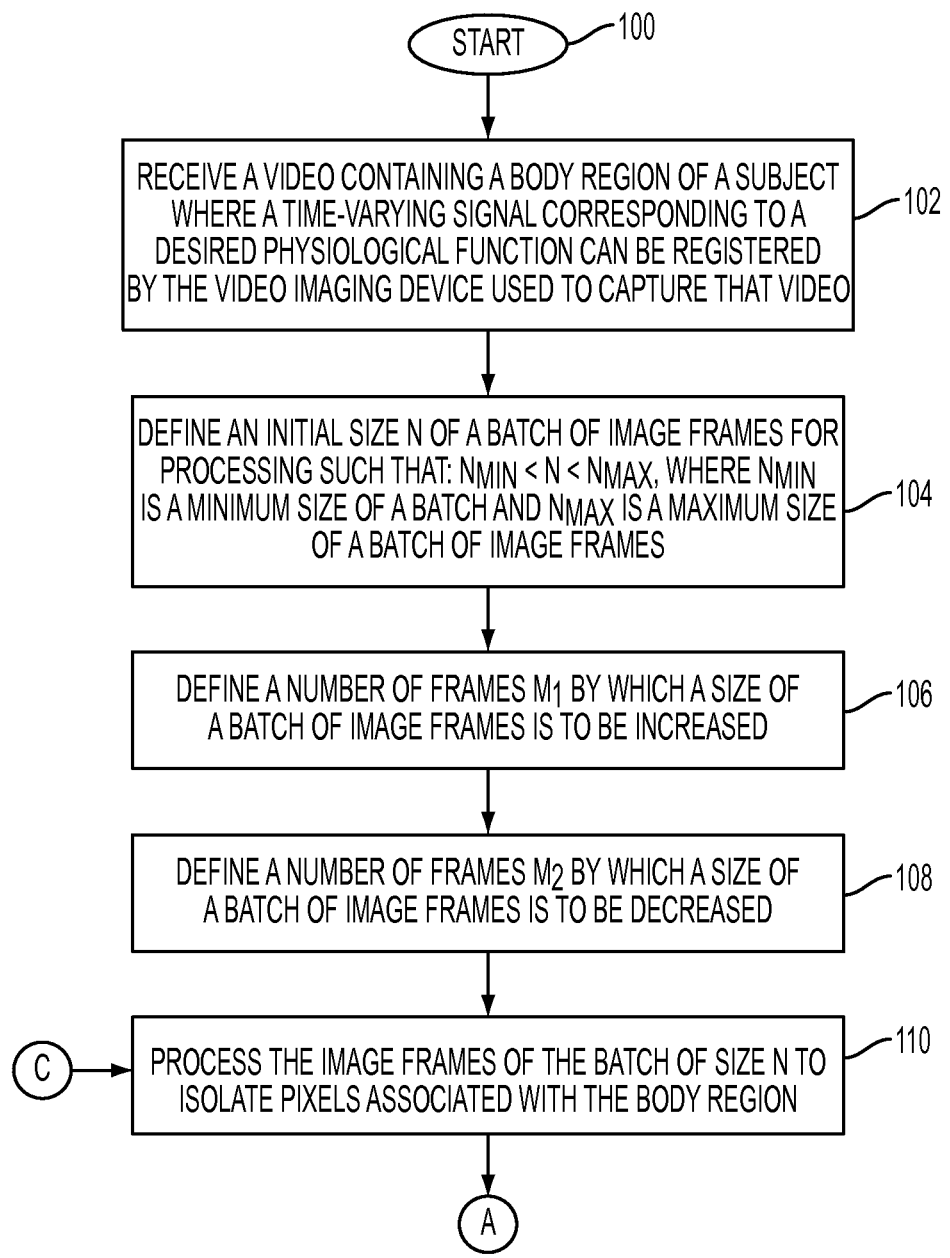
FIG. 1 is a flow chart which illustrates one example embodiment of the present method for compensating for motion during processing of a video of a subject being monitored for a physiological function in a non-contact, remote sensing environment.

What is disclosed is a system and method for compensating for motion during processing of a video of a subject being monitored for physiological function assessment in a non-contact, remote sensing environment.

NON-LIMITING DEFINITIONS

A "physiological function" is a respiratory or a cardiac function.

A "subject" refers to a living person or patient being monitored for a physiological function. Although the term "person" or "patient" may be used throughout this text, it should be appreciated that the subject may be something other than a human such as a primate. Such terms are not to be viewed as limiting the scope of the appended claims strictly to human beings.

A "video", as is generally understood, refers to a plurality of time-sequential image frames captured by a video imaging device of a subject being monitored for a physiological function. The video may also contain other components such as, audio, time, frame rate data, and the like. The video is taken of a body region of the subject where a time-varying signal corresponding to the desired physiological function can be registered by the video imaging device used to capture that video.

A "video imaging device" is a single-channel or a multi-channel video capture device, as is generally understood. The video imaging device may be a device with a high frame rate and high spatial resolution such as, for example, a monochrome camera for capturing black/white video, or a color camera for capturing color video. The video imaging device may be a device with thermal, infrared, multi-spectral or hyperspectral sensors. The video imaging device may comprise a hybrid device capable of operating in a conventional video mode with high frame rates and high spatial resolution, and a spectral mode with low frame rates but high spectral resolution. The video imaging device may have a plurality of outputs from which the video can be retrieved or otherwise received on a per-channel basis. The video imaging device may incorporate various components such as memory, one or more storage devices, and processors executing machine readable program instructions for processing and analyzing video in accordance with the teachings hereof. Video imaging devices comprising standard video equipment and those with specialized imaging sensors are available from a wide array of vendors in various streams of commerce.

"Receiving image frames" of a video is intended to be widely construed and includes: retrieving, capturing, acquiring, or otherwise obtaining image frames for processing in accordance with the methods disclosed herein. The image frames can be retrieved from a memory or storage device of the video imaging device, obtained from a remote device over a network, or from a media such as a CDROM or DVD. Image frames may be downloaded from a web-based system or application which makes such video images available for processing. Image frames can also be received from an application such as those which are available for handheld cellular devices and processed on the cellphone or other handheld computing device such as an iPad or tablet.

A "batch of image frames" means a plurality of time-sequential image frames. Batches of image frames are temporally successive, i.e., a next batch of image frames follows the previous batch. In the preferred embodiment, successive batches have significant overlaps with each other. In accordance with the teachings hereof, an initial size N of a first batch of image frames is defined such that: $N_{min} \leq N \leq N_{max}$, where $N_{min}$ is a minimum size of a batch of image frames needed to obtain an accurate physiological signal, and $N_{max}$ is a user-defined maximum size of a batch of image frames. For respiratory function assessment, a minimum size of a batch of image frames is preferably not be less than 3 breathing cycles of the subject. For cardiac function assessment, a minimum size of a batch of video image frames is preferably not be less than 1 full cardiac cycle of the subject. Successive batches of N image frames are processed to obtain a time-series signal for each batch.

A "time-series signal" is a signal, extracted from a batch of image frames that contains meaningful data that relates to the physiological function for which the subject is being monitored. A time series signal is generated from a given batch of video image frames by processing pixels in one or more areas in each of the image frames in the batch. One method for processing pixels involves isolating pixels associated with the body region in the image frame. Pixels can be isolated in the image frames using image processing techniques such as pixel classification based on color, texture, spatial features, spectral information, object identification such as face or thoracic region recognition, pattern recognition, and a user input. Then, averaging pixel values within the isolated area(s) in each frame for all image frames in the batch. An average is computed of all pixels in each of the isolated areas to obtain a channel average, on a per frame basis. The time-series signal contains frequency components of interest. Time-series signals may be normalized and may be subjected to pre-filtering to remove undesirable frequencies. Individual time-series signals can be weighted as desired. Such a weighting may be applied over one or more signal segments while other signal segments are not weighted. Methods for weighing signal segments are widely understood in the signal processing arts. Time-series signals obtained from successive batches of image frames are processed to extract a physiological signal.

A "physiological signal" is a signal corresponding to the physiological function for which the subject is being monitored. The physiological signal is extracted from a time-series signal obtained from processing a batch of image frames. The following US patent applications, which are incorporated in their entirety by reference, teach various aspects of extracting a physiological signal from a time-series signal generated from a video of a subject. "A Video Acquisition System And Method For Monitoring A Subject For A Desired Physiological Function", U.S. patent application Ser. No. 13/921,939, by Xu et al. "Processing Source Video For Real-Time Enhancement Of A Signal Of Interest", U.S. Pat. No. 8,879,867, by Tanaka et al. "Filtering Source Video Data Via Independent Component Selection", U.S. Pat. No. 8,600,213, by Mestha et al. If camera related noise or other environmental factors affecting video capture are present, compensation can be introduced as described in: "Removing Environment Factors From Signals Generated From Video Images Captured For Biomedical Measurements", U.S. Pat. No. 9,185,353, by Mestha et al. Physiological signals are stitched together to produce a continuous physiological signal for the subject. Various embodiments of signal stitching are disclosed in: "Continuous Cardiac Signal Generation From A Video Of A Subject Being Monitored For Cardiac Function", U.S. patent application Ser. No. 13/871,766, by Kyal et al. and "Continuous Cardiac Pulse Rate Estimation From Multi-Channel Source Video Data With Mid-Point Stitching", U.S. Pat. No. 9,036,877, by Kyal et al., which are incorporated herein in their entirety by reference. If the physiological function is a cardiac function then the physiological signal is a cardiac signal. The cardiac signal is used for cardiac function assessment. If the physiological function is a respiratory function then the physiological signal is a respiratory signal. The respiratory signal is used for respiratory function assessment. The physiological signal may be communicated to a display device, a storage device, a handheld wireless cellular device, or a remote device over a network.

A "body region" of the subject refers to at least a partial view of the subject's body, as seen through the aperture of the video imaging device, where a physiological signal corresponding to the physiological function can be registered by the video imaging device. Body regions where a respiratory signal can be registered by the video imaging device are those areas of the subject's body which move due to an expansion and contraction of the chest during respiration. These body regions include the subject's anterior thoracic region, a side view of the subject's thoracic region, and a back region of the subject's dorsal body. Body regions where a cardiac signal can be registered by the video imaging device are those areas of exposed skin where subcutaneous venous or arterial pulsations due to blood flow can be detected. Preferably, the video imaging device has an unobstructed view of the skin surface.

"Determining whether a movement occurred" means to determine whether movement is likely to have induced motion artifacts into the video image frames comprising that batch. The movement may be caused by the subject, the video imaging device, or when third party walked between the video imaging device and the subject. Movement may be caused by the environment surrounding the subject such as the patient's bed having moved or the pillow/sheets having shifted, light flicker, and the like. A determination whether movement occurred can be effectuated using a variety of techniques. For example, a motion detector can be utilized to sense the subject and provide a signal when the subject is moving or, conversely, provide a signal when the subject is not moving. A time interval of the image frames associated with movement can be identified accordingly. Movement can also be determined by visual observation by a trained technician tasked with observing the subject during video acquisition. Software tools can be employed to analyze batches of image frames for movement, for instance, by processing pixels in the isolated body region(s) in each of the image frames to determine an amount of change in center pixel locations associated with that area relative to a fixed object in the environment or a fixed position of the subject. Other methods include determining a rate of change of the time series signal of at least one pre-selected channel of the video imaging device; determining whether a derivative of any X or Y locations, orientations, size in the body region in a batch of image frames has changed relative to those same location in a previous batch of image frames; or determining whether a derivative of any X or Y locations in other parts of the subject's body exceed a threshold. Movement can be identified by looking for a change in a shape of the body region in the batch of image frames, i.e., the head turned, an arm moved, etc. A facial recognition algorithm or object tracking method can be utilized for movement determination. Software tools can be configured to send a signal, initiate an alert, or otherwise mark time intervals of image frames when movement was or was not detected.

A "threshold for movement", as used herein, is a level given for an amount of movement in a batch of image frames which is used for comparison purposes. The threshold may be set by a user or technician. The threshold may be based on the physiological function for which the subject is being monitored, i.e., the threshold level set for respiratory function assessment may be entirely different than the threshold set for cardiac function assessment. The threshold level may be based on a type of motion or a source of motion (i.e., by the subject or by the environment). The threshold level may be based on the time of the movement within the batch. In various embodiments hereof, the threshold for movement is dynamically adjusted in real-time. Such a dynamic adjustment can be based on, for instance, a signal-to-noise ratio of a power spectrum of the time-series signal obtained from having processed a given batch of pixels, or based on a waveform of a rhythm signal. The threshold may be dynamically adjusted by a user/technician in real-time as the video of the subject is being captured by the video imaging device. It should be appreciated that the threshold set for movement will depend on the application where the teachings hereof find their intended uses. Therefore, a discussion with respect to a particular threshold level is omitted herein. In response to the movement for a given batch of image frames having exceeded the threshold, the time-series signal obtained from that batch may be discarded. Alternatively, an indication is provided that the physiological signal extracted from the time-series signal for this batch may be unreliable and may require further processing. In other embodiments, a motion compensation strategy is applied to reduce the effects of the detected movement. Various other responses to movement exceeding the threshold include, for example, initiating an alert signal that movement is excessive; signaling a medical professional that excessive movement has occurred; changing a frame rate of the video imaging device; swapping the video imaging device for another video camera; moving a position of the video imaging device; and stopping video acquisition altogether.

"Adjusting batch size" means to change the number of image frames in that batch. Based upon the amount of movement which is determined to have occurred in a given batch, a size of a next batch of image frames is either increased or decreased. In one embodiment, a user defines a number of frames $M_1$ and $M_2$ by which a size of a given batch of image frames is to be increased and decreased, respectively, where $M_1$, $M_2 \geq 1$. In accordance with the methods disclosed herein, during processing of successive batches of image frames, if the amount of movement is determined to be greater than or equal to a threshold level set for movement, then a size N of a next batch of image frames is increased to: $N=N+M_1$, where $N+M_1 \leq N_{max}$. On the other hand, if the movement is determined to be less than the threshold level then a size N of a next batch of image frames is decreased to: $N=N-M_2$, where $N-M_2 \geq N_{min}$. Initial values for $M_1$, $M_2$, may be pre-set and then dynamically adjusted during video processing by monitoring the movement and adjusting the batch length. It is to be noted that the batch length is increased or decreased by using data from previous successive batches or from signals coming after the motion was detected.

Flow Diagram of One Example Embodiment

Reference is now being made to the flow diagram of FIG. 1 which illustrates one example embodiment of the present method for compensating for motion during processing of a video of a subject being monitored for a physiological function in a non-contact, remote sensing environment. Flow processing begins at step 100 and immediately proceeds to step 102.

At step 102, receive a video of a body region of a subject where a time-varying signal corresponding to a desired physiological function is registered by the video imaging device acquiring that video.

At step 104, define an initial size N of a batch of image frames for processing such that $N_{min} \leq N \leq N_{max}$, where $N_{min}$ is a minimum size of a batch of image frames and $N_{max}$ is a maximum size of a batch of image frames.

At step 106, define a number of frames $M_1$ by which a size of a batch of image frames is to be increased.

At step 108, define a number of frames $M_2$ by which a size of a batch of image frames is to be decreased, where $M_1, M_2 \geq 1$.

At step 110, process the batch of N image frames to isolate pixels associated with the body region. Processing continues with respect to node A.

Figure 2:
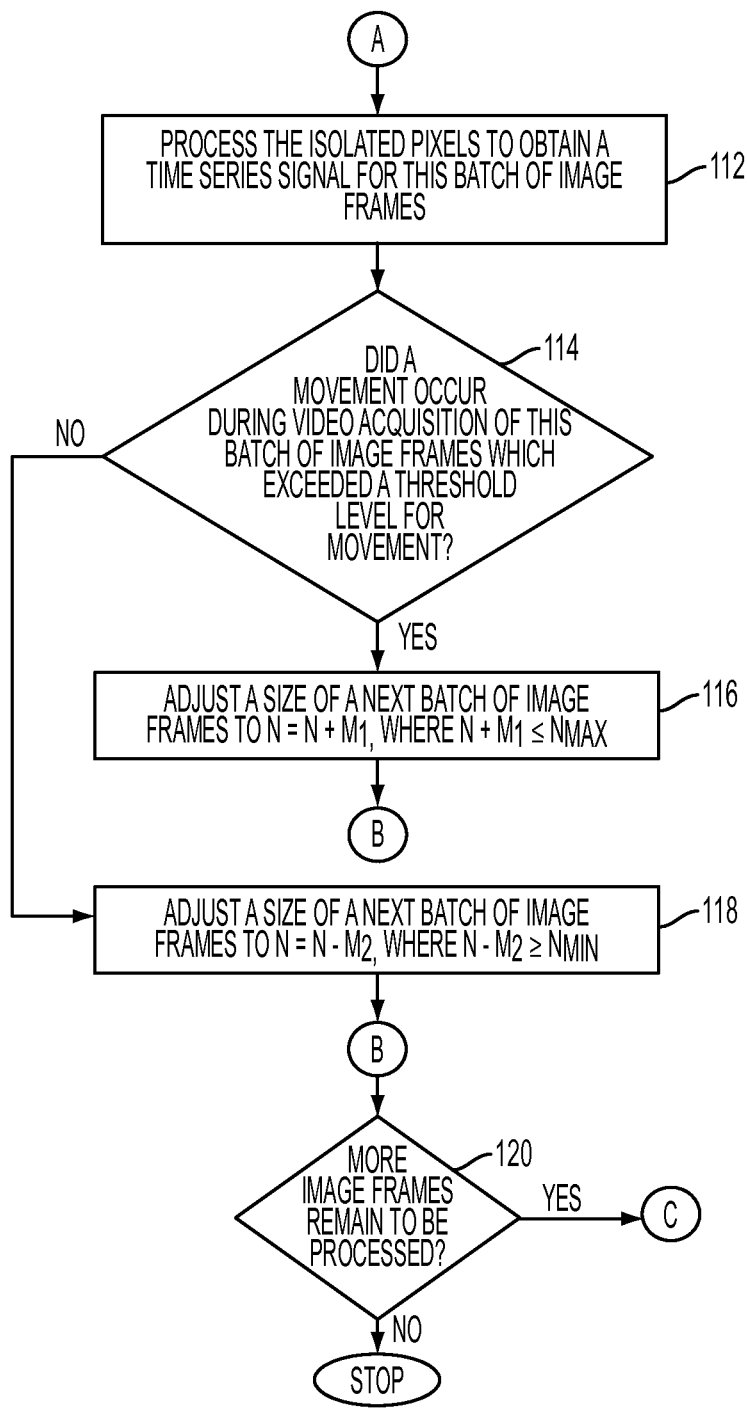
FIG. 2 is a continuation of the flow diagram of FIG. 1 with flow processing continuing with respect to node A.

Reference is now being made to FIG. 2 which is a continuation of the flow diagram of FIG. 1 with flow processing continuing with respect to node A.

At step 112, process the isolated pixels to obtain a time-series signal for this batch of image frames.

At step 114, a determination is made whether a movement occurred during video acquisition of this batch of image frames which exceeded a threshold level of movement. If so then, at step 116, adjust a size of a next batch of image frames to: $N=N+M_1$, where $N+M_1 \leq N_{max}$. Otherwise, at step 118, adjust a size of a next batch of image frames to: $N=N-M_2$, where $N-M_2 \geq N_{min}$. After having adjusted (increased or decreased) a size N of the next batch of image frames, processing continues with respect to node B.

At step 120, a determination is made whether more image frames remain to be processed. If so, then processing continues with respect to node C wherein, at step 110, a next batch of N image frames is processed. Processing repeats until no more batches of image frames remain for processing. If no more image frames remain to be processed then further processing stops.

In other embodiments, if the movement has exceeded the threshold level set for movement, an alert signal is provided. The alert may take the form of a message displayed on a display device or a sound activated at, for example, a nurse's station or control panel. The alert may take the form of a colored or blinking light which provides a visible indication that an alert condition exists. The alert can be a text, audio, and/or video message. The alert signal may be communicated to one or more remote devices over a wired or wireless network. The alert may be sent directly to a handheld wireless cellular device of a medical professional. Thereafter, additional actions would be taken in response to the alert signal. The above-described method is preferably used for patient monitoring where the image frames of the video are captured by the video imaging device in real-time and are processed as they are received to extract a physiological signal corresponding to the desired physiological function.

It should also be appreciated that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims.

Block Diagram of Video Processing System

Figure 3:
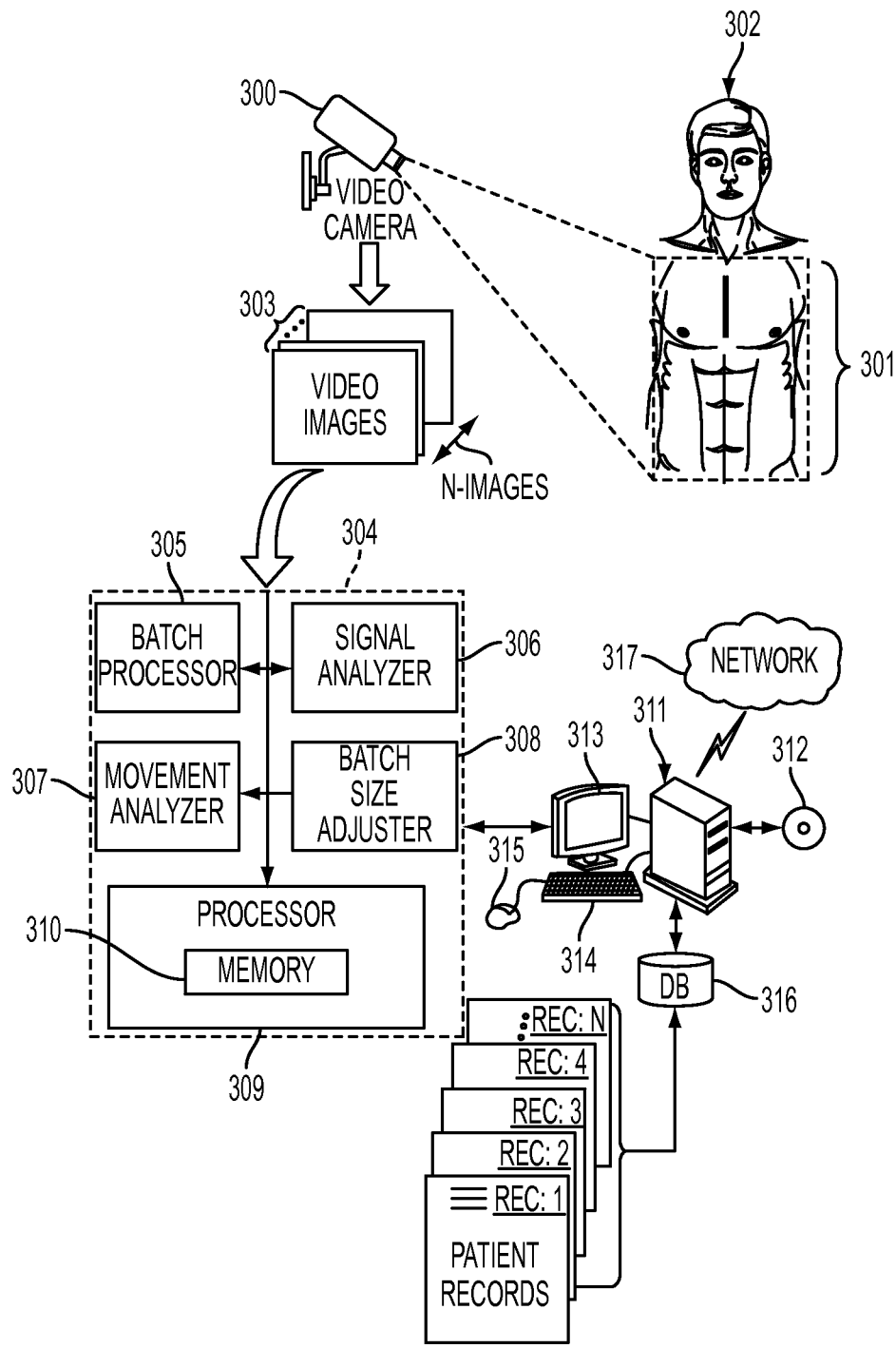
FIG. 3 shows a block diagram of one example video processing system for processing a video in accordance with the embodiment shown and described with respect to the flow diagrams of FIGS. 1-2.

Reference is now being made to FIG. 3 which shows a block diagram of one example video processing system 300 for processing a video in accordance with the embodiment shown and described with respect to the flow diagrams of FIGS. 1-2.

In FIG. 3, video imaging device 300 is shown actively acquiring a streaming video of the body region 301 of the subject 302. Video images (collectively at 303) are communicated to Video Processing System 304. Batch Processor 305 receives the defined initial size N of a batch of image frames from the workstation 311 and continuously processes successive batches of image frames of size N by isolating pixels associated with the body region in the image frames and then processing the isolated pixels to obtain a time-series signal for each batch. The time-series signal may be filtered. The time-series signal for each batch is communicated to Signal Analyzer 306 which processes the time-series signal to extract a physiological signal for the subject. Movement Analyzer 307 receives the current batch of size N from the Batch Processor 305 and makes a determination whether a movement occurred which exceeds a threshold level of movement. The determination is provided to Batch Size Adjuster 308 which receives the defined number of frames $M_1$ by which a size of a batch of image frames is to be increased and the defined number of frames $M_2$ by which a size of a batch of image frames is to be decreased from the workstation 311 and, based on the determination, adjusts a size of a next batch of image frames to: $N=N+M_1$, where $N+M_1 \leq N_{max}$. Otherwise, a size of a next batch of image frames is adjusted to: $N=N-M_2$, where $N-M_2 \geq N_{min}$. The adjusted size N is communicated to Batch Processor 305 so that a next successive batch of image frames can be processed. Central Processor (CPU) 309 retrieves machine readable program instructions from Memory 310 and is provided to facilitate the functionality of any of the modules of the video processing system 304. The processor, operating alone or in conjunction with other processors and memory, may be configured to assist or otherwise facilitate the functionality of any of the processors and modules of system 304.

Video processing system 304 is shown in communication with a workstation 311. A computer case of the workstation houses various components such as a motherboard with a processor and memory, a network card, a video card, a hard drive capable of reading/writing to machine readable media 312 such as a floppy disk, optical disk, CDROM, DVD, magnetic tape, and the like, and other software and hardware needed to perform the functionality of a computer workstation. The workstation further includes a display device 313, such as a CRT, LCD, or touchscreen device, for displaying information, video, measurement data, computed values, medical information, results, locations, and the like. A user can view any of that information and make a selection from menu options displayed thereon. Keyboard 314 and mouse 315 effectuate a user input or selection. The workstation implements a database in storage device 316 wherein patient records are stored, manipulated, and retrieved in response to a query. Such records, in various embodiments, take the form of patient medical history stored in association with information identifying the patient along with medical information. Although the database is shown as an external device, the database may be internal to the workstation mounted, for example, on a hard disk therein.

It should be appreciated that the workstation has an operating system and other specialized software configured to display alphanumeric values, menus, scroll bars, dials, slideable bars, pull-down options, selectable buttons, and the like, for entering, selecting, modifying, and accepting information needed for processing video image frames in accordance with the teachings hereof. The workstation is further enabled to display the image frames comprising the video. In other embodiments, a user or technician may use the user interface of the workstation to identify areas of interest, set parameters, select image frames and/or regions of images for processing. These selections may be stored/retrieved in a storage devices 312 and 316. Default settings and initial parameters can be retrieved from any of the storage devices shown, as needed. Although shown as a desktop computer, it should be appreciated that the workstation can be a laptop, mainframe, or a special purpose computer such as an ASIC, circuit, or the like. The embodiment of the workstation of FIG. 3 is illustrative and may include other functionality known in the arts. Any of the components of the workstation may be placed in communication with the processing system 304 or any devices in communication therewith. Moreover, any of the modules and processing units of system 304 can be placed in communication with storage device 316 and/or computer media 312 and may store/retrieve therefrom data, variables, records, parameters, functions, and/or machine readable/executable program instructions, as needed to perform their intended functions.

Each of the modules of the video processing system 304 may be placed in communication with one or more remote devices over network 317. It should be appreciated that some or all of the functionality performed by any of the modules or processing units of system 304 can be performed, in whole or in part, by the workstation placed in communication with the video imaging device 300 over network 317. The embodiment shown is illustrative and should not be viewed as limiting the scope of the appended claims strictly to that configuration. Various modules may designate one or more components which may, in turn, comprise software and/or hardware designed to perform the intended function.

The teachings hereof can be implemented in hardware or software using any known or later developed systems, structures, devices, and/or software by those skilled in the applicable art without undue experimentation from the functional description provided herein with a general knowledge of the relevant arts. One or more aspects of the methods described herein are intended to be incorporated in an article of manufacture which may be shipped, sold, leased, or otherwise provided separately either alone or as part of a product suite or a service.

It will be appreciated that the above-disclosed and other features and functions, or alternatives thereof, may be desirably combined into other different systems or applications. Presently unforeseen or unanticipated alternatives, modifications, variations, or improvements may become apparent and/or subsequently made by those skilled in this art which are also intended to be encompassed by the following claims. The teachings of any publications referenced herein are each hereby incorporated by reference in their entirety.

What is claimed is:

1. A method for compensating for motion during processing of a video of a subject being monitored for a physiological function, the method comprising:
   receiving image frames of a video captured by a video imaging device of a subject being monitored for a desired physiological function, said image frames being acquired of at least a portion of a body region of said subject where a physiological signal corresponding to said physiological function is registered by said video imaging device used to capture said video;
   defining an initial size N of a batch of image frames for processing such that $N_{min} \leq N \leq N_{max}$, where $N_{min}$ is a minimum size of a batch of image frames and $N_{max}$ is a maximum size of a batch of image frames;
   defining a number of frames $M_1$ by which a size of a given batch of image frames is to be increased, and a number of frames $M_2$ by which a size of a given batch of image frames is to be decreased, where $M_1, M_2 \geq 1$; and
   for a successive batch of image frames of size N:
      processing a current batch of image frames to isolate pixels associated with said body region;
      processing said isolated pixels to obtain a time-series signal for the current batch;
      determining whether a movement occurred during video acquisition of the current batch of image frames; and
      in response to the movement exceeding a threshold level, providing an indication that the time-series signal obtained from the current batch of image frames for processing may be unreliable and increasing a size of a next batch of image frames to: $N=N+M_1$, where $N+M_1 \leq N_{max}$, otherwise decreasing a size of a next batch of image frames to: $N=N-M_2$, where $N-M_2 \geq N_{min}$, wherein the size of a next batch of image frames is increased or decreased by using data from previous successive batches of image frames.

2. The method of claim 1, where said video imaging device is any of: a color video camera, a monochrome video camera, an infrared video camera, a multispectral video imaging device, and a hyperspectral video camera.

3. The method of claim 1, wherein pixels associated with said body region are isolated in said image frames using any of: pixel classification based on color, texture, spatial features, spectral information, object identification, pattern recognition, and a user input.

4. The method of claim 1, wherein determining whether said movement occurred comprises any of:
   determining a rate of change of said time series signal of at least one pre-selected channel of said video camera;
   determining whether a derivative of any X or Y locations, orientations, size in said region of interest has changed relative to a previous time; and
   determining whether a derivative of any X or Y locations in other parts of the subject's body exceed a pre-defined threshold.

5. The method of claim 1, wherein said threshold level of movement is based upon any of: said physiological function for which said subject is being monitored, a type of motion detected in said batch of video image frames, a source of said motion, the time of motion within the batch, and a user input.

6. The method of claim 1, further comprising, on a successive iteration, dynamically adjusting an amount of any of: $M_1$ and $M_2$, based on an amount said movement exceeded said threshold.

7. The method of claim 1, wherein, in response to said movement exceeding said threshold, further comprising any of: discarding said time-series signal obtained from the current batch, and applying motion compensation strategies to reduce the effect of motion.

8. The method of claim 1, wherein, in response to said movement exceeding said threshold level, further comprising any of: initiating an alert signal, signaling a medical professional, changing the frame rate of said video imaging device, moving a position of said video imaging device, swapping the video imaging device for another video camera, and stopping video acquisition of said subject.

9. The method of claim 1, further comprising processing said time-series signal to obtain a physiological signal which corresponds to said physiological function.

10. The method of claim 9, further comprising communicating said physiological signal to any of: a display device, a storage device, a handheld wireless cellular device, and a remote device over a network.

11. The method of claim 1, further comprising dynamically adjusting said threshold level of movement in real-time based on any of: a signal-to-noise ratio of a power spectrum of said time-series signal, a waveform of a rhythm signal, and a user input.

12. The method of claim 1, wherein said movement was caused by any of: a movement by said subject, a movement by said camera, a third party, and by the environment surrounding said subject.

13. The method of claim 1, wherein said video is a streaming video and said video image frames are processed in real-time as they are received.

14. A system for compensating for motion during processing of a video of a subject being monitored for a physiological function, the system comprising:
a memory and a storage device; and
a processor in communication with said memory and storage device, said processor executing machine readable instructions for performing:
receiving image frames of a video captured by a video imaging device of a subject being monitored for a desired physiological function, said image frames being acquired of at least a portion of a body region of said subject where a physiological signal corresponding to said physiological function is registered by said video imaging device used to capture said video;
defining an initial size N of a batch of image frames for processing such that $N_{min} \leq N \leq N_{max}$, where $N_{min}$ is a minimum size of a batch of image frames and $N_{max}$ is a maximum size of a batch of image frames;
defining a number of frames $M_1$ by which a size of a given batch of image frames is to be increased, and a number of frames $M_2$ by which a size of a given batch of image frames is to be decreased, where $M_1$, $M_2 \geq 1$; and
for a next batch of image frames of size N:
processing a current batch of image frames to isolate pixels associated with said body region;
processing said isolated pixels to obtain a time-series signal for the current batch;
determining whether a movement occurred during video acquisition of the current batch of image frames; and
in response to said movement exceeding a threshold level, providing an indication that the time-series signal obtained from the current batch of image frames may be unreliable and increasing a size of a next batch of image frames to: $N=N+M_1$, where $N+M_1 \leq N_{max}$, otherwise decreasing a size of a next batch of image frames to: $N=N-M_2$, where $N-M_2 \geq N_{min}$, wherein the size of a next batch of image frames is increased or decreased by using data from previous successive batches of image frames.

15. The system of claim 14, where said video imaging device is any of: a color video camera, a monochrome video camera, an infrared video camera, a multispectral video imaging device, and a hyperspectral video camera.

16. The system of claim 14, wherein pixels associated with said body region are isolated in said image frames using any of: pixel classification based on color, texture, spatial features, spectral information, object identification, pattern recognition, and a user input.

17. The system of claim 14, wherein determining whether said movement occurred comprises any of:
determining a rate of change of said time series signal of at least one pre-selected channel of said video camera;
determining whether a derivative of any X or Y locations, orientations, size in said region of interest has changed relative to a previous time; and
determining whether a derivative of any X or Y locations in other parts of the subject's body exceed a pre-defined threshold.

18. The system of claim 14, wherein said threshold level of movement is based upon any of: said physiological function for which said subject is being monitored, a type of motion detected in said batch of video image frames, a source of said motion, the time of motion within the batch, and a user input.

19. The system of claim 14, further comprising, on a successive iteration, dynamically adjusting an amount of any of: $M_1$ and $M_2$, based on an amount said movement exceeded said threshold.

20. The system of claim 14, wherein, in response to said movement exceeding said threshold, further comprising any of: discarding said time-series signal obtained from the current batch, and applying motion compensation strategies to reduce the effect of motion.

21. The system of claim 14, wherein, in response to said movement exceeding said threshold level, further comprising any of: initiating an alert signal, signaling a medical professional, changing the frame rate of said video imaging device, moving a position of said video imaging device, swapping the video imaging device for another video camera, and stopping video acquisition of said subject.

22. The system of claim 14, further comprising processing said time-series signal to obtain a physiological signal which corresponds to said physiological function.

23. The system of claim 22, further comprising communicating said physiological signal to any of: a display device, a storage device, a handheld wireless cellular device, and a remote device over a network.

24. The system of claim 14, further comprising dynamically adjusting said threshold level of movement in real-time based on any of: a signal-to-noise ratio of a power spectrum of said time-series signal, a waveform of a rhythm signal, and a user input.

25. The system of claim 14, wherein said video is a streaming video and said video image frames are processed in real-time as they are received.

* * * * *